(12) United States Patent
Previdi et al.

(10) Patent No.: US 7,848,240 B2
(45) Date of Patent: Dec. 7, 2010

(54) METHOD AND APPARATUS FOR FORWARDING DATA IN A DATA COMMUNICATIONS NETWORK

(75) Inventors: Stefano Benedetto Previdi, Rome (IT); Clarence Filsfils, Brussels (BE); Jean-Philippe Vasseur, Dunstable, MA (US)

(73) Assignee: Cisco Technology, Inc., San Jose, CA (US)

( * ) Notice: Subject to any disclaimer, the term of this patent is extended or adjusted under 35 U.S.C. 154(b) by 1515 days.

(21) Appl. No.: 10/858,920

(22) Filed: Jun. 1, 2004

(65) Prior Publication Data

US 2005/0265239 A1    Dec. 1, 2005

(51) Int. Cl.
G01R 31/08    (2006.01)
(52) U.S. Cl. ........................ 370/238; 370/400
(58) Field of Classification Search ............... 370/238, 370/236, 400
See application file for complete search history.

(56) References Cited

U.S. PATENT DOCUMENTS

| | | | |
|---|---|---|---|
| 5,128,926 A | 7/1992 | Perlman et al. | |
| 5,243,592 A | 9/1993 | Perlman et al. | |
| 5,253,248 A | 10/1993 | Dravida et al. | |
| 5,265,092 A | 11/1993 | Soloway et al. | |
| 5,430,727 A | 7/1995 | Callon | |
| 5,825,772 A * | 10/1998 | Dobbins et al. | 370/396 |
| 5,959,968 A | 9/1999 | Chin et al. | |
| 5,999,286 A | 12/1999 | Venkatesan | |
| 6,032,194 A | 2/2000 | Gai et al. | |
| 6,044,075 A * | 3/2000 | Le Boudec et al. | 370/351 |
| 6,098,107 A | 8/2000 | Narvaez-Guarnieri et al. | |
| 6,111,257 A | 8/2000 | Shand et al. | |
| 6,128,750 A | 10/2000 | Espy et al. | |
| 6,148,410 A | 11/2000 | Baskey et al. | |
| 6,185,598 B1 * | 2/2001 | Farber et al. | 709/200 |
| 6,243,754 B1 | 6/2001 | Guerin et al. | |
| 6,256,295 B1 | 7/2001 | Callon | |
| 6,295,275 B1 | 9/2001 | Croslin | |
| 6,321,271 B1 | 11/2001 | Kodialam et al. | |
| 6,343,122 B1 | 1/2002 | Andersson | |

(Continued)

FOREIGN PATENT DOCUMENTS

CN     1440159 A     9/2003

(Continued)

OTHER PUBLICATIONS

Wang, Zheng et al., "Shortest Path First with Emergency Exits," ACM 089791-405-8/90/0009/0166, 1990, pp. 166-176.

(Continued)

*Primary Examiner*—Seema S Rao
*Assistant Examiner*—Sai-Ming Chan
(74) *Attorney, Agent, or Firm*—Hickman Palermo Truong & Becker LLP

(57) ABSTRACT

A method is disclosed of forwarding data in a data communications network comprising a plurality of nodes and links therebetween, each link having an associated usage cost and a load capacity. A forwarding node identifies a lowest cost route, comprising one or more links, to a destination node. If a plurality of lowest cost routes is identified, then the forwarding node allocates data for forwarding along each of the lowest cost routes dependent on a relative load capacity of that route.

15 Claims, 6 Drawing Sheets

U.S. PATENT DOCUMENTS

| | | | |
|---|---|---|---|
| 6,349,091 B1 | 2/2002 | Li | |
| 6,356,546 B1 * | 3/2002 | Beshai | 370/358 |
| 6,363,319 B1 * | 3/2002 | Hsu | 370/238 |
| 6,389,764 B1 | 5/2002 | Stubler et al. | |
| 6,415,427 B2 | 7/2002 | Nitta et al. | |
| 6,449,279 B1 | 9/2002 | Belser et al. | |
| 6,473,421 B1 | 10/2002 | Tappan | |
| 6,507,577 B1 | 1/2003 | Mauger et al. | |
| 6,535,481 B1 | 3/2003 | Andersson et al. | |
| 6,578,086 B1 | 6/2003 | Regan et al. | |
| 6,668,282 B1 | 12/2003 | Booth et al. | |
| 6,690,671 B1 * | 2/2004 | Anbiah et al. | 370/395.43 |
| 6,697,325 B1 | 2/2004 | Cain | |
| 6,697,333 B1 | 2/2004 | Bawa et al. | |
| 6,704,320 B1 | 3/2004 | Narvaez et al. | |
| 6,711,125 B1 | 3/2004 | Walrand et al. | |
| 6,714,551 B1 | 3/2004 | Le-Ngoc | |
| 6,724,722 B1 | 4/2004 | Wang et al. | |
| 6,778,531 B1 | 8/2004 | Kodialam et al. | |
| 6,829,215 B2 | 12/2004 | Tornar | |
| 6,928,484 B1 | 8/2005 | Huai et al. | |
| 6,944,131 B2 | 9/2005 | Beshai et al. | |
| 6,982,951 B2 | 1/2006 | Doverspike et al. | |
| 6,993,593 B2 * | 1/2006 | Iwata | 709/238 |
| 6,996,065 B2 | 2/2006 | Kodialam et al. | |
| 7,058,016 B1 * | 6/2006 | Harper | 370/238 |
| 7,065,059 B1 | 6/2006 | Zinn | |
| 7,099,286 B1 | 8/2006 | Swallow | |
| 7,113,481 B2 | 9/2006 | Elie-Dit-Cosaque et al. | |
| 7,158,486 B2 | 1/2007 | Rhodes | |
| 7,188,280 B2 | 3/2007 | Shinomiya et al. | |
| 7,242,664 B2 | 7/2007 | Einstein et al. | |
| 7,248,579 B1 | 7/2007 | Friedman | |
| 7,260,645 B2 | 8/2007 | Bays | |
| 7,274,654 B2 | 9/2007 | Yang et al. | |
| 7,274,658 B2 | 9/2007 | Bornstein et al. | |
| 7,280,472 B2 | 10/2007 | Rigby et al. | |
| 7,349,427 B1 | 3/2008 | Canning et al. | |
| 7,362,709 B1 | 4/2008 | Hui et al. | |
| 7,490,165 B1 | 2/2009 | Katukam et al. | |
| 7,500,013 B2 * | 3/2009 | Dziong et al. | 709/238 |
| 2002/0004843 A1 | 1/2002 | Andersson et al. | |
| 2002/0037010 A1 | 3/2002 | Yamauchi | |
| 2002/0093954 A1 | 7/2002 | Weil et al. | |
| 2002/0112072 A1 | 8/2002 | Jain | |
| 2002/0116669 A1 | 8/2002 | Jain | |
| 2002/0131362 A1 | 9/2002 | Callon | |
| 2002/0136223 A1 | 9/2002 | Ho | |
| 2002/0171886 A1 | 11/2002 | Wu et al. | |
| 2002/0172157 A1 | 11/2002 | Rhodes | |
| 2002/0191545 A1 | 12/2002 | Pieda et al. | |
| 2003/0063613 A1 | 4/2003 | Carpini et al. | |
| 2003/0079040 A1 | 4/2003 | Jain et al. | |
| 2003/0123457 A1 | 7/2003 | Koppol | |
| 2003/0161338 A1 | 8/2003 | Ng et al. | |
| 2003/0193959 A1 | 10/2003 | Lui et al. | |
| 2004/0001497 A1 | 1/2004 | Sharma | |
| 2004/0001508 A1 | 1/2004 | Zheng et al. | |
| 2004/0038671 A1 | 2/2004 | Trayford et al. | |
| 2004/0071089 A1 | 4/2004 | Bauer et al. | |
| 2004/0085894 A1 | 5/2004 | Wang et al. | |
| 2004/0088429 A1 | 5/2004 | Luo | |
| 2004/0117251 A1 | 6/2004 | Charles Shand | |
| 2004/0151181 A1 | 8/2004 | Chu et al. | |
| 2004/0203827 A1 | 10/2004 | Heiner et al. | |
| 2005/0007950 A1 | 1/2005 | Liu | |
| 2005/0031339 A1 | 2/2005 | Qiao et al. | |
| 2005/0038909 A1 | 2/2005 | Yoshiba et al. | |
| 2005/0047353 A1 | 3/2005 | Hares | |
| 2005/0097219 A1 | 5/2005 | Goguen et al. | |
| 2005/0226400 A1 | 10/2005 | Farber et al. | |
| 2005/0265228 A1 | 12/2005 | Fredette et al. | |
| 2005/0281271 A1 | 12/2005 | Beshai et al. | |
| 2006/0013125 A1 | 1/2006 | Vasseur et al. | |
| 2006/0018253 A1 | 1/2006 | Windisch et al. | |
| 2006/0221962 A1 | 10/2006 | Previdi et al. | |
| 2006/0268879 A1 | 11/2006 | Xhafa et al. | |
| 2007/0011284 A1 | 1/2007 | Le Roux et al. | |
| 2007/0038767 A1 | 2/2007 | Miles et al. | |
| 2007/0183317 A1 | 8/2007 | Vasseur et al. | |
| 2007/0201355 A1 | 8/2007 | Vasseur et al. | |
| 2007/0248016 A1 | 10/2007 | Ashwood Smith et al. | |

FOREIGN PATENT DOCUMENTS

| | | |
|---|---|---|
| WO | WO 01/78278 A1 | 10/2001 |
| WO | WO 02/06918 | 1/2002 |

OTHER PUBLICATIONS

International Searching Authority, International Search Report, PCT/US04/33827, dated Mar. 28, 2005, 8 pages.

Current Claims, PCT/US04/33827, 6 pages.

Office Action from China for foreign patent application 200480033399.8 dated Feb. 29, 2008 (4 pgs) with English Translation (4 pgs).

Current claims in China patent application 200480033399.8 (3 pgs) with marked up copy (4 pgs).

AU Examiner's First Report for foreign patent application No. 2004311004 dated Jun. 23, 2008 (1 pg).

AU Examiner's Second Report for foreign patent application No. 2004311004 dated Aug. 18, 2008 (1 pg).

Current claims for AU foreign patent application No. 2004311004 (6 pgs).

Office Action from CN for foreign application No. 200480033007.8 dated Apr. 11, 2008 (10 pgs) with English translation (11 pgs).

Current claims for CN foreign patent application No. 200480033007.8 (6 pgs).

Thorup, Michael, "Fortifying OSPF/IS-IS against link-failure", Sep. 2007, 10 pages.

Wang, Zheng et al., "Shortest Path First with Emergency Exists", ACM, 1990, 10 pages.

Karn, "Improving Round Trip Time Estimates in Reliable Transport Protocols", ACM, Transaction on Computer Systems, 1987, 8 pages.

Backes, "Spanning Tree Bridges—Transparent Bridges for Interconnection of IEEE 802 LANs", 1988, IEEE, 5 pages.

Office Action from EPO for foreign patent application No. 04 800 942.7-1525 dated Apr. 27, 2009, (6 pgs).

European Patent Office, "Supplementary European Search Report", application No. EP 04795045, May 27, 2009, 4 pages.

Claims, application No. EP 04795045, 4 pages.

Raju et al., "A New Approach to On-Demand Loop-Free Multipath Routing", Computer Communications and Networks, 1999, IEEE, Oct. 1999, XP010359531, ISBN: 978-0-7803-5794-5, 6 pages.

European Patent Office, "Communication pursuant to Article 94(3) EPC", Application No. 04795045.6-2416, dated Sep. 7, 2009, 5 pages.

Current Claims, Application No. 04795045.6-2416, 5 pages.

Karn Phil et al., Improving Round-Trip Time Estimates in Reliable Transport Protocols, 1987, ACM workshop on Frontiers in computer communication technology, pp. 2-7.

Open System Interconnection Routing Protocol, Jun. 1999, Chapter 41, Internetworking Technologies handbook (all pages of chapter 41).

Open Shortest Path First, Jun. 1999, Chapter 42, Internetworking Technologies handbook (all pages of chapter 42).

European Search Report received in Application No. 05749440.3 dated Dec. 4, 2009 (3 pages).

Current Claims—Application No. 05749440.3 dated Jan. 2010 (3 pages).

U.S. Appl. No. 10/323,358, filed Dec. 17, 2002, Notice of Allowance, Mailing Date Apr. 15, 2010.

ISO/IEC 10589: "Information technology—Telecommunications and information exchange between systems—Intermediate System to Intermediate System intra-domain routing information exchange protocol for use in conjunction with the protocol for providing the connectionless-mode network service", (ISO 8473), Second edition, Nov. 15, 2002, 208 pages.

Moy, J et al., "OSPF Version 2", IETF Standard, Network Working Group, Internet Engineering Task Force, IETF, Apr. 1998, XP015008112, NFC 2328, 245 pages.

European Patent Office, "Supplementary Search Report", application No. EP 04812468, dated May 27, 2010, 4 pages.

Claims, application No. EP 04812468, 4 pages.

* cited by examiner

METHOD AND APPARATUS FOR FORWARDING DATA IN A DATA COMMUNICATIONS NETWORK

FIELD OF THE INVENTION

The present invention generally relates to forwarding data. The invention relates more specifically to a method and apparatus for forwarding data in a data communications network.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In computer networks such as the Internet, packets of data are sent from a source to a destination via a network of elements including links (communication paths such as telephone or optical lines) and nodes (usually routers directing the packet along one or more of a plurality of links connected to it) according to one of various routing protocols.

One class of routing protocol is the link state protocol. The link state protocol relies on a routing algorithm resident at each node. Each node on the network advertises, throughout the network, links to neighboring nodes and provides a cost associated with each link, which can be based on any appropriate metric such as link bandwidth or delay and is typically expressed as an integer value. A link may have an asymmetric cost, that is, the cost in the direction AB along a link may be different from the cost in the direction BA. Based on the advertised information in the form of a link state packet (LSP) each node constructs a link state database (LSDB), which is a map of the entire network topology and from that constructs generally a single optimum route to each available node based on an appropriate algorithm such as, for example, a shortest path first (SPF) algorithm. As a result a "spanning tree" (SPT) is constructed, rooted at the node and showing an optimum path including intermediate nodes to each available destination node. The results of the SPF are stored in a routing information base (RIB) and based on these results the forwarding information base (FIB) or forwarding table is updated to control forwarding of packets appropriately. When there is a network change an LSP representing the change is flooded through the network by each node adjacent the change, each node receiving the LSP and sending it to each adjacent node.

As a result, when a data packet for a destination node arrives at a node (the "first node"), the first node identifies the optimum route to that destination and forwards the packet to the next node along that route. The next node repeats this step and so forth.

Generally, data is forwarded along a single link to an adjacent node but in some instances an "equal cost path split" occurs in which two or more equal lowest cost routes are available. In that case the forwarding node will implement load balancing whereby the load is shared equally between the links.

Problems arise in networks when congestion occurs in parts of the network. A known solution to the problem is to avoid such congestion by engineering the costs of the links to reflect their capacity. One such approach is described in B. Fortz and M. Thorup, "Internet traffic engineering by optimizing OSPF weights," in Proc. IEEE INFOCOM, pp. 519-528, 2000 ("Thorup et al") in which the cost of a link is inversely proportional to its capacity or bandwidth as a result of which less traffic is routed over low capacity links.

However problems arise with the approach set out in Thorup et al. In particular load will either be spread evenly between equal cost routes or not at all in that arrangement.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for forwarding data in a data communication network is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

| | |
|---|---|
| 1.0 | General Overview |
| 2.0 | Structural and Functional Overview |
| 3.0 | Method of Forwarding Data |
| 4.0 | Implementation Mechanisms - Hardware Overview |
| 5.0 | Extensions and Alternatives |

1.0 General Overview

The needs identified in the foregoing Background, and other needs and objects that will become apparent for the following description, are achieved in the present invention, which comprises, in one aspect, a method of forwarding data in a data communications network comprising a plurality of nodes and links therebetween, each link having an associated usage cost and a load capacity. A forwarding node identifies a lowest cost route, comprising one or more links, to a destination node. If a plurality of lowest cost routes is identified the forwarding node allocates data for forwarding along each of the lowest cost routes dependent on a relative load capacity of that route.

In other aspects, the invention encompasses a computer apparatus and a computer-readable medium configured to carry out the foregoing steps.

2.0 Structural and Functional Overview

Figure 1:
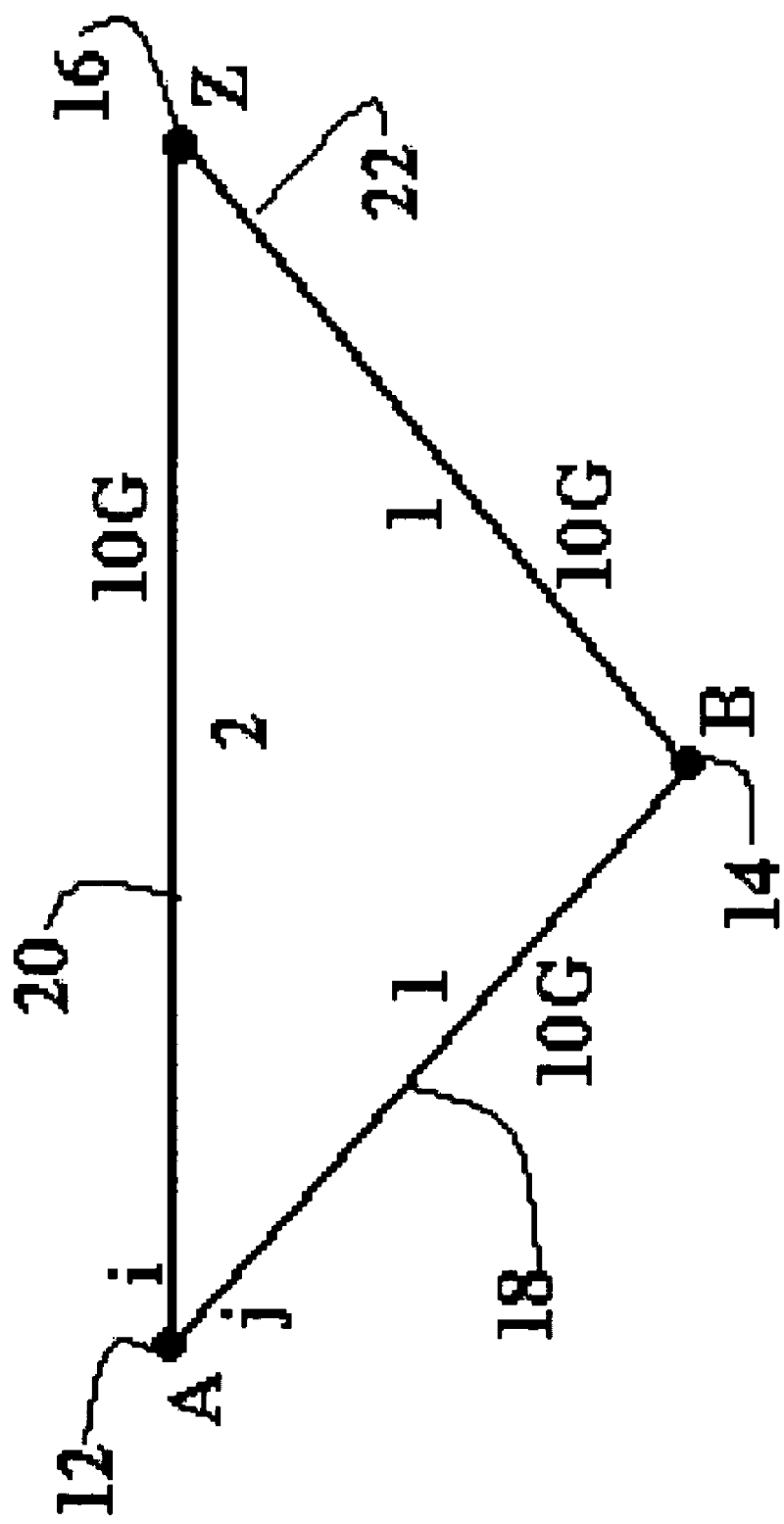
FIG. 1 is a representation of a network illustrating a method of forwarding data.

In overview a method of forwarding data can be understood with reference to FIG. 1 which depicts an illustrative network diagram to which the method is applied. The network includes node A (reference numeral 12), node B (reference numeral 14) and node Z (reference numeral 16). Nodes A and B are joined by link 18, nodes A and Z are joined by link 20 and nodes B and Z are joined by link 22. Link 18 is connected at an interface j to node A and link 20 is connected at an interface i to node A. The cost of links 18 and 22 is 1 and the cost of link 20 is 2. All links have a load capacity or bandwidth of 10 GB.

It will be seen that the cost of forwarding data from node A to node Z is the same whether the route is via link 20 (cost 2) or via links 18 and 22 and node B (cost 1+1=2). As a result the load is shared between the two routes AZ, ABZ and as both routes have an equal bandwidth of 10 GB congestion is minimized.

Figure 2:
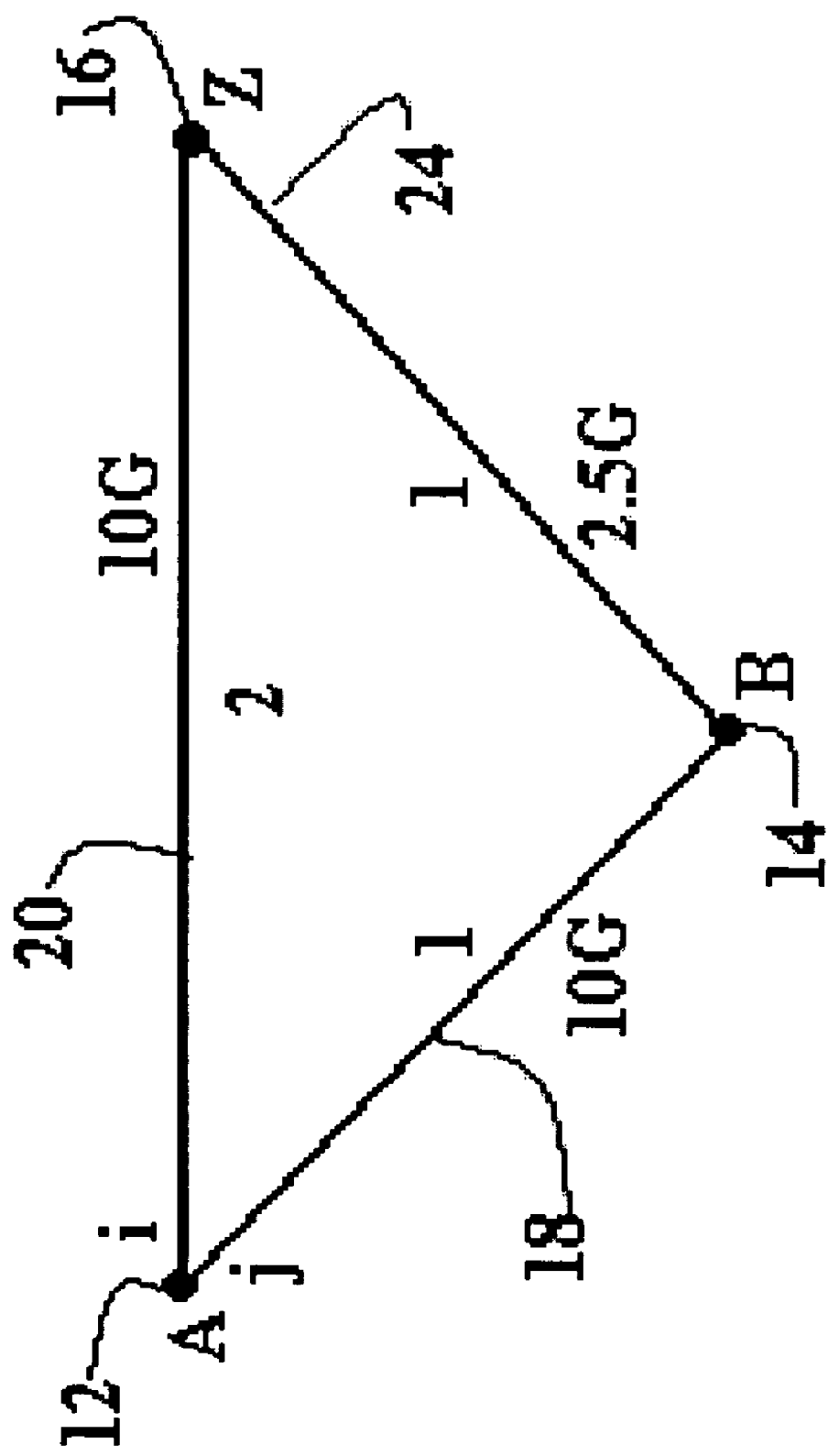
FIG. 2 is a representation of an alternative network illustrating a method of forwarding data.

Referring to FIG. 2 which depicts an alternative illustrative network diagram to which the method is applied, it will be seen that the nodes, links, costs and load capacities are the same as in FIG. 1 except that node B and node Z are connected by link 24 having a bandwidth of 2.5 GB. Once again the cost of routing data from node A to node Z is equal whether via link 20 or via links 18 and 24. However in this case the route ABZ via links 18 and 24 has a minimum bandwidth of 2.5 GB which is thus taken as the route bandwidth. Thus if the load was shared evenly between the two routes then congestion of the lower bandwidth route could occur at the same time as under use of the higher bandwidth route.

Accordingly the method described herein allocates the load proportionally with bandwidth. In the specific case shown in FIG. 2 the load is shared in the ratio 10 GB:2.5 GB i.e. in the ratio 80:20 between route AZ and route ABZ. As a result weighted fair load balancing is achieved. In addition this is achieved using existing routes computed according to the SPF and hence avoiding looping.

3.0 Method and Apparatus for Forwarding Data

Implementation of the method will be described in more detail with reference to the SPF algorithm (also known as Dijkstra's algorithm). The algorithm is well understood by the skilled reader and well documented in pre-existing documentation and therefore is not described in detail here but only in summary, for the purposes of clarity.

In general a node, say node A, calculates its least cost (shortest path) routes to each other node on the network from its LSDB. To do this, all nodes on the network are divided into three categories, unknown (UNK), tentative or candidate (TENT) and known (PATHS). For each node the cost of reaching that node from node A, and the interface along which it is reached at that cost (representing the next hop) are stored. Initially node A is assigned to category TENT and all other nodes are assigned to UNK. The algorithm then carries out repeatedly the step of moving the lowest cost node in TENT to PATH and moving all neighbors of that lowest cost node together with their cost via the corresponding interface from node A to TENT. As a result, in the first step node A is moved to PATH and each of its neighbors to TENT. In the next step the lowest cost node in TENT is moved into PATH and its neighbors are moved into TENT. As a result the nodes in UNK and TENT gradually deplete until all nodes have been moved to PATH. As a result PATH comprises a list of the lowest cost interface (or next hop) for routing data from node A to each other node.

Figure 3:
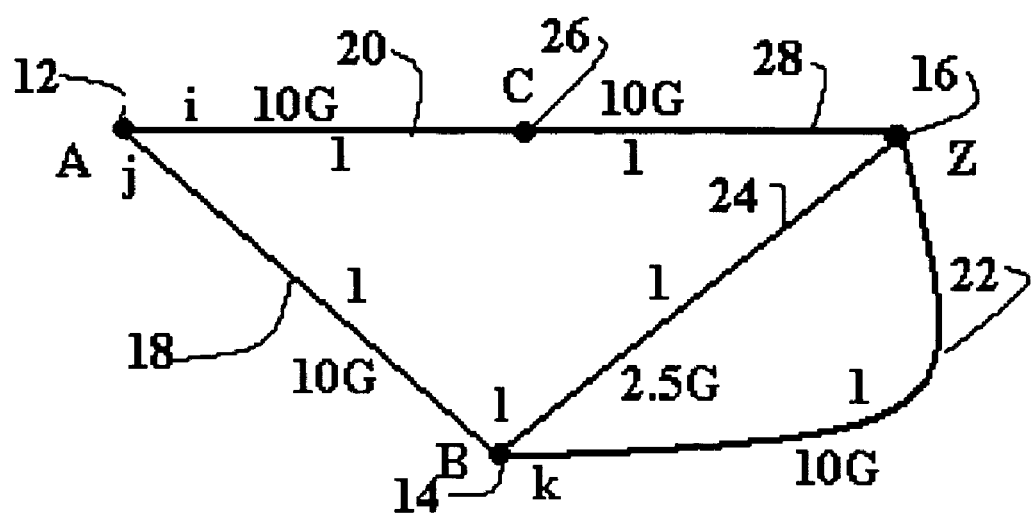
FIG. 3 is a representation of a network illustrating in more detail a method of forwarding data.
Figure 4:
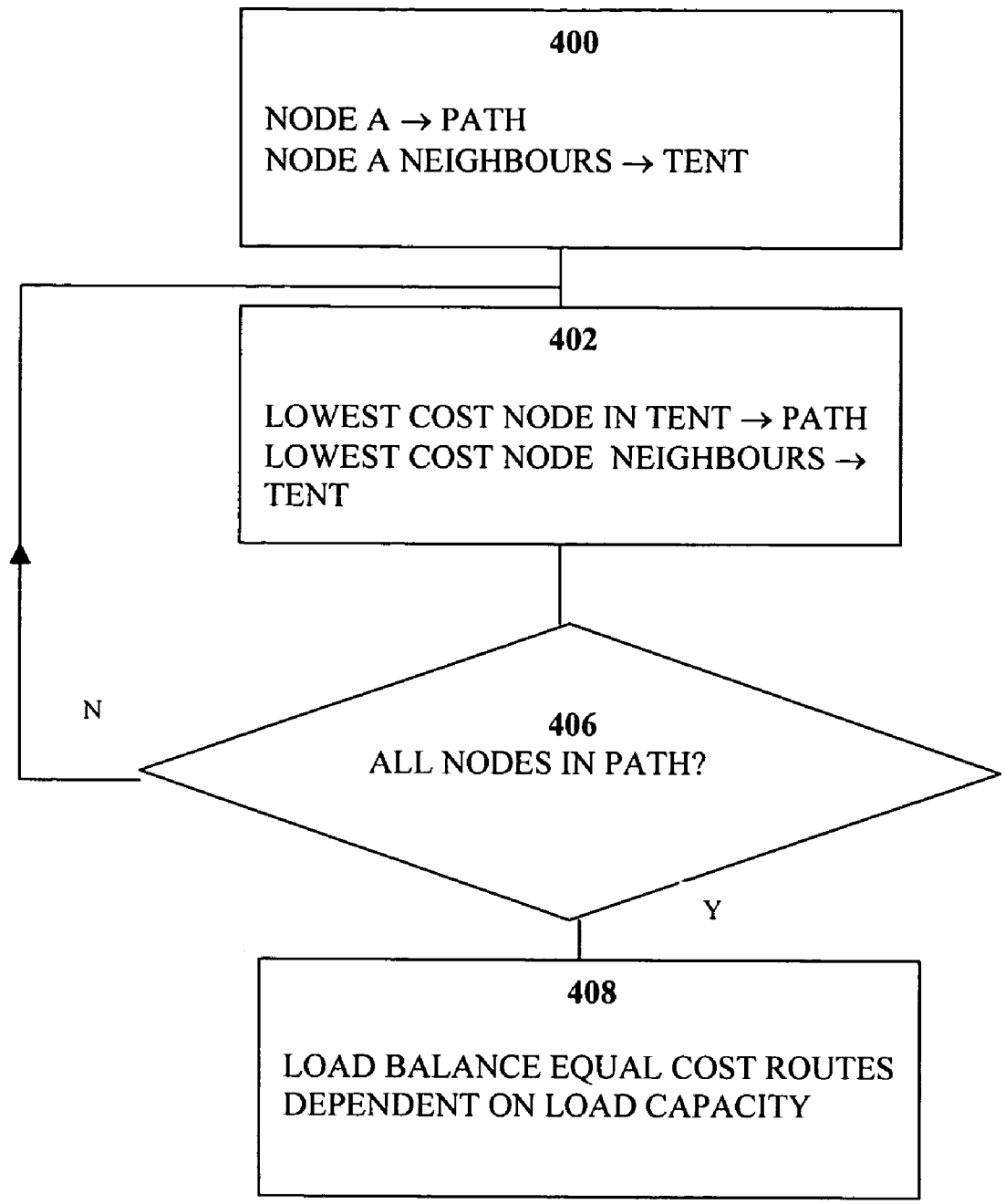
FIG. 4 is a flow diagram that illustrates the steps involved in forwarding data according to the method.

Reference is now made to FIG. 3 which is a network diagram illustrating a network to which the method described herein can be applied and FIG. 4 which is a flow diagram illustrating in more detail implementation of the method. Implementation of the SPF algorithm to achieve weighted fair load balancing according to the present method can be better understood with respect to FIG. 3 and FIG. 4 in the case of matched bandwidth routes.

In particular FIG. 3 shows a network similar to that of FIG. 1 and FIG. 2 but in which an additional node C, reference numeral 26, is introduced between nodes A and Z, joined to node Z via link 28 having cost 1 and capacity 10 GB. The cost of link 20 from interface i of node A to node C is reduced to 1. In addition node B has two interfaces k, l both connecting node B to node Z via respective links 22, cost 1, bandwidth 10 GB and 24, cost 1, bandwidth 2.5 GB.

In order to calculate the SPF at node A, the algorithm described above is followed but with the introduction of an extra parameter associated with a node in UNK/TENT/PATH "minimum bandwidth along the best path to this node".

The node is thus categorized X(a, b, c) where:

X is the node name a is the root node's outgoing interface used by the best path from the root node to X b is the minimum link bandwidth across that path c is the path metric (cost) of that path.

It will be appreciated that the root node is the node at which the SPF computation is taking place—in the present case, node A. As will be discussed in more detail below, where multiple paths sharing the same root node's outgoing interface share the same metric, the "b" term (capacity) of the resulting path is the maximum of the "b" terms of the underlying paths.

Implementation of the algorithm can be understood with reference to FIG. 4 in conjunction with FIG. 3. In block 400 a first node under consideration, such as node A, is transferred to PATH, and the neighbors of the first node are transferred to TENT together with their associated parameters as shown in Table 1 below. As a result the table is as shown below in Table 1 in which, for example, it can be seen that node C is shown as reachable via interface i with a bandwidth of 10 GB and cost 1. The remaining nodes are maintained in UNK.

TABLE 1

| UNK | TENT | PATH |
|---|---|---|
| Z | C (i, 10G, 1) | A |
| | B (j, 10G, 1) | |

In block 402 the lowest cost node in TENT is once again transferred to PATH and its neighbors are transferred to TENT. Referring to Table 2 below it will be seen that as a result node C has been moved to PATH as a result of which the least cost route to node C from A is known to be via interface i at cost 1, bandwidth 10 GB. Node Z has been transferred to TENT together with the corresponding bandwidth and cost via interface i.

Table 2

| UNK | TENT | PATH |
|---|---|---|
| — | B (j, 10G, 1) | A |
| | Z (i, 10G, 2) | C (i, 10G, 1) |

In block 406 the algorithm assesses whether all nodes have been transferred to PATH. If not then step 402 is repeated. Otherwise in block 408 the forwarding node (or not node), node A, carries out load balancing proportional to the bandwidth ratio as discussed in more detail below.

In relation to the algorithm computed at node A in relation to the network of FIG. 3, therefore, step 402 is repeated and node B is transferred to PATH. As a result an alternative route to Z via interface j (and hence node B) is introduced into TENT as can be seen in Table 3.

Table 3

| UNK | TENT | PATH |
|---|---|---|
| — | Z (i, 10G, 2) or Z (j, 10G; 2) | A C (i, 10G, 1) B (j, 10G, 1) |

Block 402 is repeated once again and in this case node Z is transferred to PATH by either of interfaces i or j as the cost is the same in each case, namely 2. However as the bandwidth via either route ACZ (interface i) or ABZ (interface j) is the same, then the load is spread 50/50 between the interfaces as shown in Table 4.

TABLE 4

| UNK | TENT | PATH |
|---|---|---|
| — | — | A C (i, 10G, 1) B (j, 10G, 1) Z (i, 10G, 2) or Z (j, 10G, 2) |

It will be noted that the link between nodes B and Z is assigned the higher of the two available bandwidths via interface k (link 24) and interface l (link 22), namely 10 GB. It will be further noted that node B will itself implement weighted load balancing between interfaces k and l proportional to their respective capacities, that is in ratio 80/20 as discussed in more detail below. Accordingly, in an alternative implementation, the link between nodes B and Z can be assigned the sum of the bandwidth via each interface sharing the same cost metric, namely 12 GB and the remaining steps herein carried out accordingly. Of course if the links carry different costs, then only the lower cost and associated bandwidth are assigned.

Figure 5:
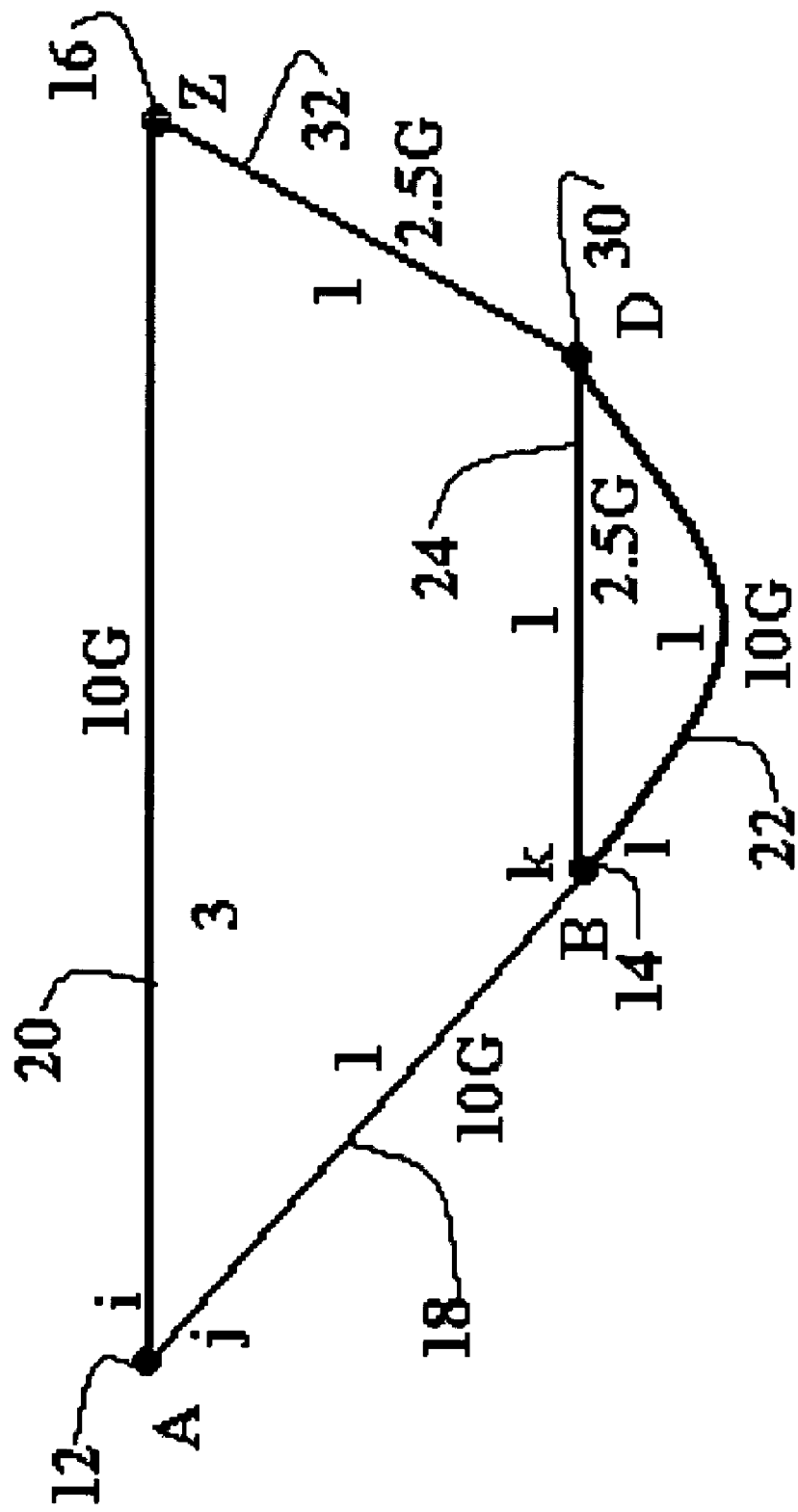
FIG. 5 is a representation of an alternative network illustrating in more detail a method of forwarding data.

Implementation of the method in an instance where alternative routes have unequal capacities can be better understood with reference to FIG. 5 which is a network diagram illustrating an alternative network. FIG. 5 corresponds effectively to an overlay of the networks of FIG. 1 and FIG. 2 but with the addition of a node D, reference numeral 30 connected between node B and node Z by link 32 having cost 1 and capacity 2.5 GB. Node B is linked to node D via links 22 and 24 of costs 1 and respective bandwidths 10 GB, 2.5 GB. The cost of link 20 between nodes A and Z is 3.

Once again implementing the algorithm described with reference to FIG. 4, in block 400 node A is moved to PATH and nodes Z and B together with the associated interfaces, bandwidths and costs are moved to TENT as shown in Table 5 below.

TABLE 5

| UNK | TENT | PATH |
|---|---|---|
| D | Z (i, 10G, 3) B (j, 10G, 1) | A |

In block 402 the lowest cost node, node B is moved from TENT to PATH and node D is moved from UNK to TENT. As two links are provided from node B to node D, the maximum bandwidth represented, i.e. 10 G, is associated with node D in TENT as shown in Table 6.

TABLE 6

| UNK | TENT | PATH |
|---|---|---|
| — | Z (i, 10G, 3) D (j, 10G, 2) | A B (j, 10G, 1) |

Block 402 is once again repeated and node D transferred to PATH. As a result node Z via interface j is added to TENT such that both routes to node Z are provided in TENT either via interface i (route AZ) or interface j (route ABDZ) as can be seen in Table 7 below.

TABLE 7

| UNK | TENT | PATH |
|---|---|---|
| — | Z (i, 10G, 3) or Z (j, 2.5G, 3) | A B (j, 10G, 1) D (j, 10G, 2) |

Block 402 is repeated once more and both routes to node Z are transferred to PATH as shown in Table 8 below.

TABLE 8

| UNK | TENT | PATH |
|---|---|---|
| — | — | A B (j, 10G, 1) D (j, 10G, 3) Z (i, 10G, 3) or Z (j, 2.5G, 3) |

As a result node A will load balance packets for node Z via the two possible routes AZ (interface i), ABDZ (interface j), but proportional to the ratio of their bandwidth. Accordingly 80% of traffic will go via node AZ and 20% via ABDZ and the traffic is assigned to the interfaces accordingly in ratio 10 GB:2.5 GB i.e. 80/20. Once again node B will implement load balancing itself between interfaces k and l in the ratio of the respective capacities of the links.

As a result of the method described herein network capacity is maximized without affecting the SPF calculations nor introducing potential loops.

It will be appreciated that the method can be implemented in one or more of hardware or software elements, or firmware using for example microcode, or any combination thereof, such that detailed explanation is not required by the skilled reader. Once the SPF algorithm has been completed and the ratios assigned to the respective interfaces, allocation of the data between the interfaces can be achieved in any appropriate manner, for example as described in "Troubleshooting Load Balancing Over Parallel Links using Cisco Express Forwarding" which is available at the time of this writing on the file "technologies_tech_note09186a0080094806.shtml" in the directory "en/US/tech/tk827/tk831" of the domain cisco.com of the World Wide Web, the entire contents of which are incorporated herein by reference for all purposes as if set forth fully herein.

4.0 Implementation Mechanisms—Hardware Overview

Figure 6:
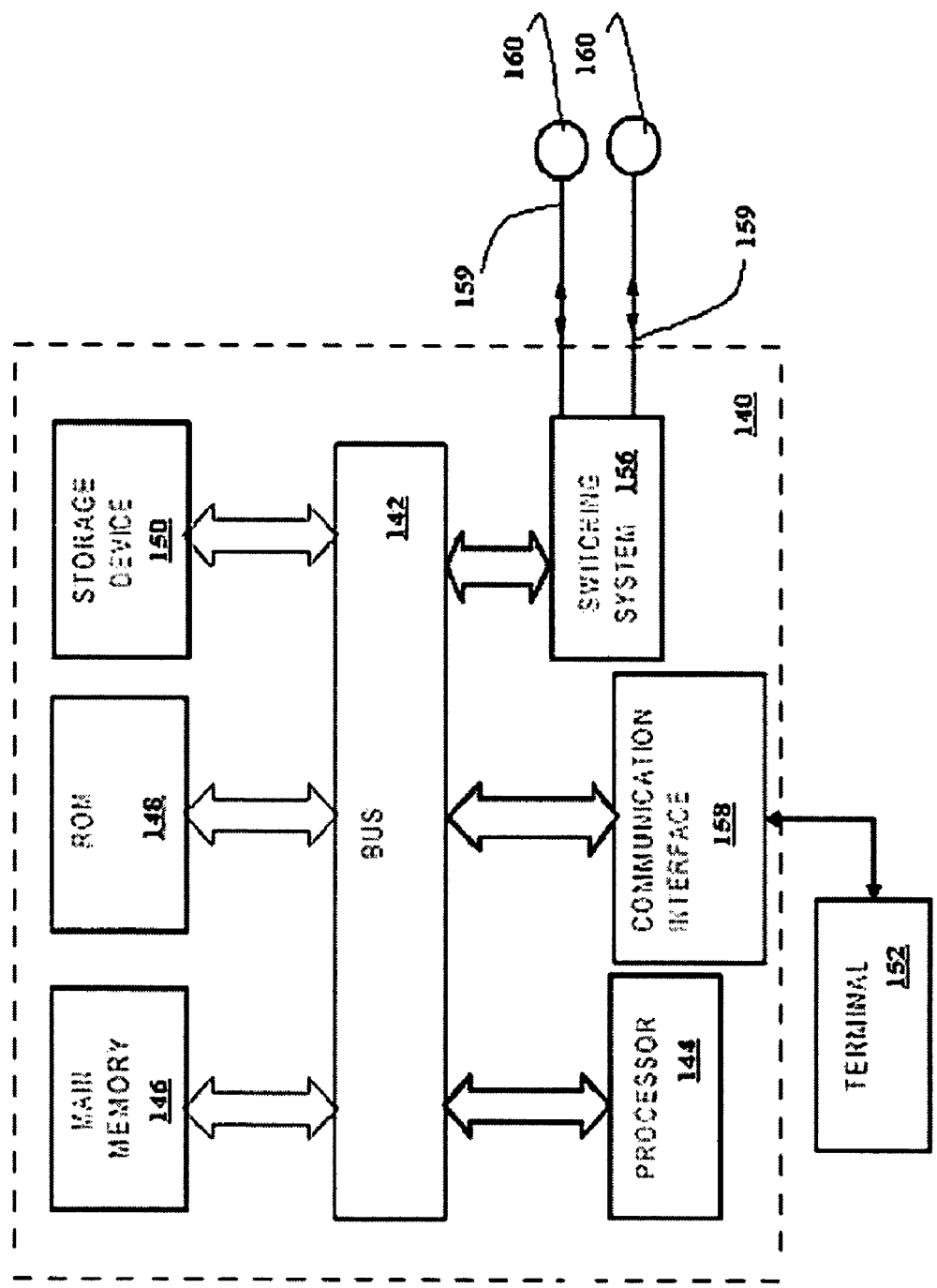
FIG. 6 is a block diagram illustrating a computer system upon which a method of forwarding data may be implemented.

FIG. 6 is a block diagram that illustrates a computer system 140 upon which the method may be implemented. The method is implemented using one or more computer programs running on a network element such as a router device. Thus, in this embodiment, the computer system 140 is a router.

Computer system 140 includes a bus 142 or other communication mechanism for communicating information, and a processor 144 coupled with bus 142 for processing information. Computer system 140 also includes a main memory 146, such as a random access memory (RAM), flash memory, or other dynamic storage device, coupled to bus 142 for storing information and instructions to be executed by processor 144. Main memory 146 may also be used for storing temporary variables or other intermediate information during execution of instructions to be executed by processor 144. Computer system 140 further includes a read only memory (ROM) 148 or other static storage device coupled to bus 142 for storing static information and instructions for processor 144. A storage device 150, such as a magnetic disk, flash memory or optical disk, is provided and coupled to bus 142 for storing information and instructions.

A communication interface 158 may be coupled to bus 142 for communicating information and command selections to processor 144. Interface 158 is a conventional serial interface such as an RS-232 or RS-422 interface. An external terminal 152 or other computer system connects to the computer system 140 and provides commands to it using the interface 158. Firmware or software running in the computer system 140 provides a terminal interface or character-based command interface so that external commands can be given to the computer system.

A switching system 156 is coupled to bus 142 and has an input interface and a respective output interface (commonly designated 159) to external network elements. The external network elements may include a plurality of additional routers 160 or a local network coupled to one or more hosts or routers, or a global network such as the Internet having one or more servers. The switching system 156 switches information traffic arriving on the input interface to output interface 159 according to pre-determined protocols and conventions that are well known. For example, switching system 156, in cooperation with processor 144, can determine a destination of a packet of data arriving on the input interface and send it to the correct destination using the output interface. The destinations may include a host, server, other end stations, or other routing and switching devices in a local network or Internet.

The computer system 140 implements as a router acting as a forwarding node the above described method of forwarding data. The implementation is provided by computer system 140 in response to processor 144 executing one or more sequences of one or more instructions contained in main memory 146. Such instructions may be read into main memory 146 from another computer-readable medium, such as storage device 150. Execution of the sequences of instructions contained in main memory 146 causes processor 144 to perform the process steps described herein. One or more processors in a multi-processing arrangement may also be employed to execute the sequences of instructions contained in main memory 146. In alternative embodiments, hard-wired circuitry may be used in place of or in combination with software instructions to implement the method. Thus, embodiments are not limited to any specific combination of hardware circuitry and software.

The term "computer-readable medium" as used herein refers to any medium that participates in providing instructions to processor 144 for execution. Such a medium may take many forms, including but not limited to, non-volatile media, volatile media, and transmission media. Non-volatile media includes, for example, optical or magnetic disks, such as storage device 150. Volatile media includes dynamic memory, such as main memory 146. Transmission media includes coaxial cables, copper wire and fiber optics, including the wires that comprise bus 142. Transmission media can also take the form of wireless links such as acoustic or electromagnetic waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 144 for execution. For example, the instructions may initially be carried on a magnetic disk of a remote computer. The remote computer can load the instructions into its dynamic memory and send the instructions over a telephone line using a modem. A modem local to computer system 140 can receive the data on the telephone line and use an infrared transmitter to convert the data to an infrared signal. An infrared detector coupled to bus 142 can receive the data carried in the infrared signal and place the data on bus 142. Bus 142 carries the data to main memory 146, from which processor 144 retrieves and executes the instructions. The instructions received by main memory 146 may optionally be stored on storage device 150 either before or after execution by processor 144.

Interface 159 also provides a two-way data communication coupling to a network link that is connected to a local network. For example, the interface 159 may be an integrated services digital network (ISDN) card or a modem to provide a data communication connection to a corresponding type of telephone line. As another example, the interface 159 may be a local area network (LAN) card to provide a data communication connection to a compatible LAN. Wireless links may also be implemented. In any such implementation, the interface 159 sends and receives electrical, electromagnetic or optical signals that carry digital data streams representing various types of information.

The network link typically provides data communication through one or more networks to other data devices. For example, the network link may provide a connection through a local network to a host computer or to data equipment operated by an Internet Service Provider (ISP). The ISP in turn provides data communication services through the worldwide packet data communication network now commonly referred to as the "Internet". The local network and the Internet both use electrical, electromagnetic or optical signals that carry digital data streams. The signals through the various networks and the signals on the network link and through the interface 159, which carry the digital data to and from computer system 140, are exemplary forms of carrier waves transporting the information.

Computer system 140 can send messages and receive data, including program code, through the network(s), network link and interface 159. In the Internet example, a server might transmit a requested code for an application program through the Internet, ISP, local network and communication interface 158. One such downloaded application provides for the method as described herein.

The received code may be executed by processor 144 as it is received, and/or stored in storage device 150, or other non-volatile storage for later execution. In this manner, computer system 140 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

It will be appreciated that the method can be implemented in relation to any size or type of network and that any appropriate routing protocol and mechanism can be adopted to implement the invention. For example it will be appreciated that any appropriate routing protocol can be used such as Intermediate System-Intermediate System (IS-IS) or Open Shortest Path First (OSPF) and in networks using any appropriate forwarding mechanism such as Internet Protocol (IP). Indeed the invention can be implemented using any least cost routing technique. The method steps set out can be carried out in any appropriate order and aspects from the examples and embodiments described juxtaposed or interchanged as appropriate.

Furthermore it will be appreciated that although in an optimization the approach described above is implemented at each node in a network it can be implemented at only one or a sub-set of all of the nodes with equal effect and without affecting routing across the network adversely.

What is claimed is:

1. A method of forwarding data in a data communications network comprising a plurality of nodes and links therebetween, each link having a usage cost and a load capacity, the method comprising:
   identifying, using a shortest path first algorithm, a plurality of lowest cost routes, comprising one or more links, to a destination node;
   associating, in the shortest path first algorithm, each lowest cost route of the plurality of lowest cost routes with a load capacity;
   wherein at least two of the lowest cost routes are associated with unequal load capacities;
   calculating a ratio of the associated load capacities;
   allocating data for forwarding along each of the lowest cost routes in proportion to the calculated ratio;
   wherein the method is performed by a forwarding node in the data communications network, the forwarding node having one or more processors.

2. A method as claimed in claim 1 in which the load capacity of a particular route among the lowest cost routes is selected as the lowest load capacity of any link along the particular route.

3. A method as claimed in claim 1 in which, where a plurality of links connects adjacent nodes, the load capacity between those nodes is set as the maximum load capacity of any one of those links.

4. A method as claimed in claim 1 in which, where a plurality of links connects adjacent nodes, the load capacity between these nodes is set as the sum of the load capacity of each of these links.

5. A non-transitory computer readable storage medium storing one or more sequences of instructions for forwarding data in a data communications network comprising a plurality of nodes and links there between, each link having a usage cost and a load capacity, which instructions, when executed by one or more processors, cause the one or more processors to perform:
   at a forwarding node, identifying, using a shortest path first algorithm, a plurality of lowest cost routes, comprising one or more links, to a destination node;
   at the forwarding node, associating, in the shortest path first algorithm, each lowest cost route of the plurality of lowest cost routes with a load capacity;
   wherein at least two of the lowest cost routes are associated with unequal load capacities;
   at the forwarding node, calculating a ratio of the associated load capacities;
   at the forwarding node, allocating data for forwarding along each of the lowest cost routes in proportion to the calculated ratio.

6. An apparatus for forwarding data in a data communications network comprising a plurality of nodes and links therebetween, each link having a usage cost and a load capacity, the apparatus comprising:
   means for identifying, using a shortest path first algorithm, a plurality of lowest cost routes, comprising one or more links, to a destination node;
   means for associating, in the shortest path first algorithm, each lowest cost route of the plurality of lowest cost routes with a load capacity;
   wherein at least two of the lowest cost routes have unequal load capacities;
   means for calculating a ratio of the associated load capacities;
   means for allocating data for forwarding along each of the lowest cost routes in proportion to the calculated ratio.

7. An apparatus as claimed in claim 6, in which the load capacity of a particular route among the lowest cost routes is selected as the lowest load capacity of any link along the particular route.

8. An apparatus as claimed in claim 6 in which, where a plurality of links connects adjacent nodes, the load capacity between those nodes is set as the maximum load capacity of any one of those links.

9. An apparatus as claimed in claim 6 in which, where a plurality of links connects adjacent nodes, the load capacity between those nodes is set as the sum of the load capacity of each of those links.

10. An apparatus for forwarding data in a data communications network, the apparatus comprising:
    one or more processors;
    a network interface communicatively coupled to the one or more processors and configured to communicate one or more packet flows among the one or more processors and a network; and
    a non-transitory computer readable medium comprising one or more sequences of instructions for forwarding data in a data communications network comprising a plurality of nodes and links there between, each link having a usage cost and a load capacity, which instructions, when executed by the one or more processors, cause the one or more processors to perform:
    identifying, using a shortest path first algorithm, a plurality of lowest cost routes, comprising one or more links, to a destination node;

associating, in the shortest path first algorithm, each lowest cost route of the plurality of lowest cost routes with a load capacity;
wherein at least two of the lowest cost routes are associated with unequal load capacities;
calculating a ratio of the associated load capacities;
allocating data for forwarding along each of the lowest cost routes in proportion to the calculated ratio.

11. An apparatus as claimed in claim 10 in which, where a plurality of links connects adjacent nodes, the instructions cause setting the load capacity between those nodes as the maximum load capacity of any one of those links.

12. An apparatus as claimed in claim 10 in which, where a plurality of links connects adjacent nodes, the instructions cause setting the load capacity between these nodes as the sum of the load capacity of each of these links.

13. A method as recited in claim 1, further comprising:
identifying a plurality of lowest cost routes between the forwarding node and a destination node sharing a common outgoing interface at the forwarding node;
selecting a maximum load capacity among the plurality of lowest cost routes;
using the selected maximum load capacity for a load capacity value for all the plurality of lowest cost routes when data is forwarded on any of the plurality of lowest cost routes.

14. An apparatus as recited in claim 6, further comprising:
means for identifying a plurality of lowest cost routes between the forwarding node and a destination node sharing a common outgoing interface at the forwarding node;
means for selecting a maximum load capacity among the plurality of lowest cost routes;
means for using the selected maximum load capacity for a load capacity value for all the plurality of lowest cost routes when data is forwarded on any of the plurality of lowest cost routes.

15. An apparatus as recited in claim 10, further comprising instructions which when executed by the one or more processors cause the one or more processors to perform:
identifying a plurality of lowest cost routes between the forwarding node and a destination node sharing a common outgoing interface at the forwarding node;
selecting a maximum load capacity among the plurality of lowest cost routes;
using the selected maximum load capacity for a load capacity value for all the plurality of lowest cost routes when data is forwarded on any of the plurality of lowest cost routes.

* * * * *